United States Patent
Shimahashi

(10) Patent No.: US 10,529,058 B2
(45) Date of Patent: Jan. 7, 2020

(54) IMAGE PROCESSING APPARATUS THAT SMOOTHS IMAGE USING CLASSIFICATION RESULT OF PIXELS INCLUDED THEREIN

(71) Applicant: BROTHER KOGYO KABUSHIKI KAISHA, Nagoya, Aichi (JP)

(72) Inventor: Takuya Shimahashi, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 176 days.

(21) Appl. No.: 15/875,013

(22) Filed: Jan. 19, 2018

(65) Prior Publication Data

US 2018/0240218 A1    Aug. 23, 2018

(30) Foreign Application Priority Data

Feb. 17, 2017   (JP) ................. 2017-028490

(51) Int. Cl.
G06T 5/00      (2006.01)
G06K 9/62      (2006.01)
G06K 9/46      (2006.01)

(52) U.S. Cl.
CPC ............ *G06T 5/002* (2013.01); *G06K 9/4609* (2013.01); *G06K 9/628* (2013.01)

(58) Field of Classification Search
CPC ....... G06T 5/002; G06K 9/4609; G06K 9/628
See application file for complete search history.

(56) References Cited

U.S. PATENT DOCUMENTS

| | | | | |
|---|---|---|---|---|
| 9,569,821 B2* | 2/2017 | Takahashi | ................. | G06T 5/50 |
| 2007/0273929 A1* | 11/2007 | Hayashi | ............... | H04N 1/4051 |
| | | | | 358/3.13 |
| 2009/0161947 A1* | 6/2009 | Choki | ...................... | G06K 9/40 |
| | | | | 382/155 |
| 2011/0085738 A1* | 4/2011 | Kitamura | ............... | G06T 5/002 |
| | | | | 382/199 |
| 2011/0255741 A1* | 10/2011 | Jung | .................. | G06K 9/00369 |
| | | | | 382/103 |

(Continued)

OTHER PUBLICATIONS

Rubinstein et al. "A Comparative Study of Image Retargeting" ACM Transactions on Graphics, vol. 29, Issue 6, Dec. 2010.*

*Primary Examiner* — Mia M Thomas
(74) *Attorney, Agent, or Firm* — Scully, Scott, Murphy & Presser, PC

(57) ABSTRACT

An image processing apparatus performs: classifying a plurality of pixels including a plurality of first and second pixels into respective ones of first and second types, the plurality of first pixels constituting an edge; and smoothing a target pixel, the smoothing including: designating the target pixel from the plurality of second pixels; and changing a target pixel value to a smoothed target pixel value using at least one of a plurality of peripheral pixel values. In the smoothing, a first contribution of a first specific peripheral pixel to a first smoothed target pixel value is smaller than a second contribution of a second specific peripheral pixel to a second smoothed target pixel value, the first and second specific peripheral pixels being classified into respective ones of the first and second types and being positioned at a specific position relative to respective ones of first and second target pixels.

19 Claims, 7 Drawing Sheets

(56) References Cited

U.S. PATENT DOCUMENTS

| | | | |
|---|---|---|---|
| 2012/0121204 A1* | 5/2012 | Ding | G06T 3/0012 |
| | | | 382/260 |
| 2013/0121565 A1* | 5/2013 | Wang | G06K 382/159 |
| | | | 382/159 |
| 2015/0103250 A1* | 4/2015 | Watanabe | H04N 5/21 |
| | | | 348/576 |
| 2016/0253788 A1* | 9/2016 | Lee | G06T 5/002 |
| | | | 382/262 |
| 2017/0154215 A1* | 6/2017 | Niinuma | G02B 27/017 |
| 2017/0344849 A1* | 11/2017 | Li | G06K 9/00476 |
| 2018/0068426 A1* | 3/2018 | Matsunaga | A61B 5/444 |
| 2018/0182123 A1* | 6/2018 | Fang | G06T 7/62 |
| 2018/0288278 A1* | 10/2018 | Yamada | H04N 1/40093 |
| 2019/0236787 A1* | 8/2019 | Seo | G06T 5/002 |

* cited by examiner

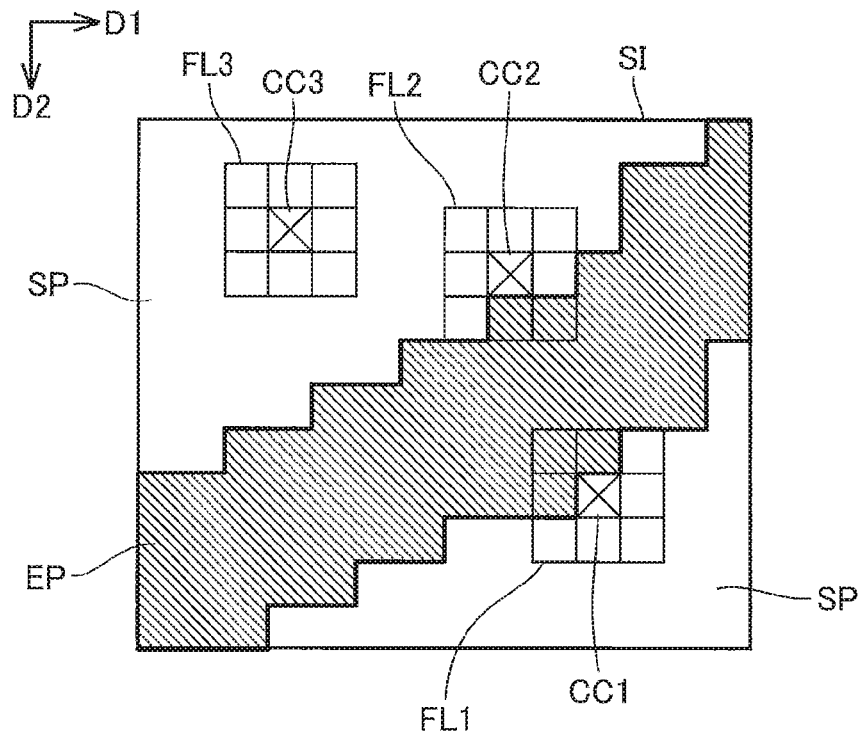

IMAGE PROCESSING APPARATUS THAT SMOOTHS IMAGE USING CLASSIFICATION RESULT OF PIXELS INCLUDED THEREIN

CROSS REFERENCE TO RELATED APPLICATION

This application claims priority from Japanese Patent Application No. 2017-028490 filed Feb. 17, 2017. The entire content of the priority application is incorporated herein by reference.

TECHNICAL FIELD

The present disclosure relates to image processing including smoothing processing to be applied to an image represented by image data.

BACKGROUND

Conventionally a technique that specifies a character area and a non-character area in an image and applies edge extraction processing to data in the character area while applying smoothing processing to data in the non-character area has been known.

SUMMARY

However, a concrete method for the smoothing processing has not been disclosed at all. Thus, in the technique described above, an image may not be appropriately smoothed by the smoothing processing to cause deterioration in image quality of the resultant image.

The present specification discloses a technique that applies adequate smoothing processing to image data to suppress deterioration in image quality of the resultant image.

In view of the foregoing, the technique disclosed in the present specification has been made to solve at least a part of the above problem and can be realized as the following application example.

In order to attain the above and other objects, the present disclosure provides an image processing apparatus that includes: a processor; and a memory. The memory stores a set of computer-readable instructions therein. The set of computer-readable instructions, when executed by the processor, causes the image processing apparatus to perform: acquiring target image data representing a target image, the target image including a plurality of pixels; classifying the plurality of pixels into a plurality of types including a first type and a second type different from the first type, the plurality of pixels including a plurality of first pixels having respective ones of a plurality of first pixel values and a plurality of second pixels having respective ones of a plurality of second pixel values, the plurality of first pixels constituting an edge in the target image and being classified into the first type, the plurality of second pixels being classified into the second type; smoothing a target pixel having a target pixel value, the smoothing including: designating the target pixel from the plurality of second pixels; and changing the target pixel value to a smoothed target pixel value using at least one of a plurality of peripheral pixel values, the plurality of pixels including a plurality of peripheral pixels of the target pixel, the plurality of peripheral pixels having respective ones of the plurality of peripheral pixel values. In the smoothing, a first contribution of a first specific peripheral pixel to a first smoothed target pixel value of a first target pixel is smaller than a second contribution of a second specific peripheral pixel to a second smoothed target pixel value of a second target pixel. The first specific peripheral pixel is classified into the first type and is positioned at a specific position relative to the first target pixel. The second specific peripheral pixel is classified into the second type and is positioned at the specific position relative to the second target pixel.

According to another aspect, the present disclosure provides a non-transitory computer readable storage medium storing a set of program instructions for installed on and executed by a computer. The set of program instructions includes: acquiring target image data representing a target image, the target image including a plurality of pixels; classifying the plurality of pixels into a plurality of types including a first type and a second type different from the first type, the plurality of pixels including a plurality of first pixels having respective ones of a plurality of first pixel values and a plurality of second pixels having respective ones of a plurality of second pixel values, the plurality of first pixels constituting an edge in the target image and being classified into the first type, the plurality of second pixels being classified into the second type; smoothing a target pixel having a target pixel value, the smoothing including: designating the target pixel from the plurality of second pixels; and changing the target pixel value to a smoothed target pixel value using at least one of a plurality of peripheral pixel values, the plurality of pixels including a plurality of peripheral pixels of the target pixel, the plurality of peripheral pixels having respective ones of the plurality of peripheral pixel values. In the smoothing, a first contribution of a first specific peripheral pixel to a first smoothed target pixel value of a first target pixel is smaller than a second contribution of a second specific peripheral pixel to a second smoothed target pixel value of a second target pixel. The first specific peripheral pixel is classified into the first type and is positioned at a specific position relative to the first target pixel. The second specific peripheral pixel is classified into the second type and is positioned at the specific position relative to the second target pixel.

According to still another aspect, the present disclosure provides an image processing method. The image processing method includes: acquiring target image data representing a target image, the target image including a plurality of pixels; classifying the plurality of pixels into a plurality of types including a first type and a second type different from the first type, the plurality of pixels including a plurality of first pixels having respective ones of a plurality of first pixel values and a plurality of second pixels having respective ones of a plurality of second pixels values, the plurality of first pixels constituting an edge in the target image and being classified into the first type, the plurality of second pixels being classified into the second type; smoothing a target pixel having a target pixel value, the smoothing including: designating the target pixel from the plurality of second pixels; and changing the target pixel value to a smoothed target pixel value using at least one of a plurality of peripheral pixel values, the plurality of pixels including a plurality of peripheral pixels of the target pixel, the plurality of peripheral pixels having respective ones of the plurality of peripheral pixel values. In the smoothing, a first contribution of a first specific peripheral pixel to a first smoothed target pixel value of a first target pixel is smaller than a second contribution of a second specific peripheral pixel to a second smoothed target pixel value of a second target pixel. The first specific peripheral pixel is classified into the first type and is positioned at a specific position relative to the first target pixel. The second specific peripheral pixel is classified into the second type and is positioned at the specific position relative to the second target pixel.

BRIEF DESCRIPTION OF THE DRAWINGS

The particular features and advantages of the disclosure as well as other objects will become apparent from the following description taken in connection with the accompanying drawings, in which:

FIGS. 3A and 3B are views each illustrating an example of an image used in the image processing, in which FIG. 3A illustrates an example of a scan image represented by scan data, and FIG. 3B illustrates an example of a binary image represented by binary image data (classification data);

FIGS. 4A to 4C are views each illustrating an example of an image used in the image processing, in which FIG. 4A illustrates an example of a sharpened image represented by sharpened image data, FIG. 4B illustrates an example of a smoothed image represented by smoothed image data, and FIG. 4C illustrates an example of a processed image represented by processed image data;

FIGS. 8A to 8D are explanatory views for explaining the smoothed image generation processing, in which FIG. 8A is a view conceptually illustrating a part of a scan image, FIG. 8B illustrates an original Gaussian filter, FIG. 8C illustrates a modified filter for a first target pixel illustrated in FIG. 8A, and FIG. 8D illustrates a modified filter for a second target pixel illustrated in FIG. 8A.

DETAILED DESCRIPTION

A. Embodiment:

A-1: Configuration of Multifunction Peripheral 200

Figure 1:
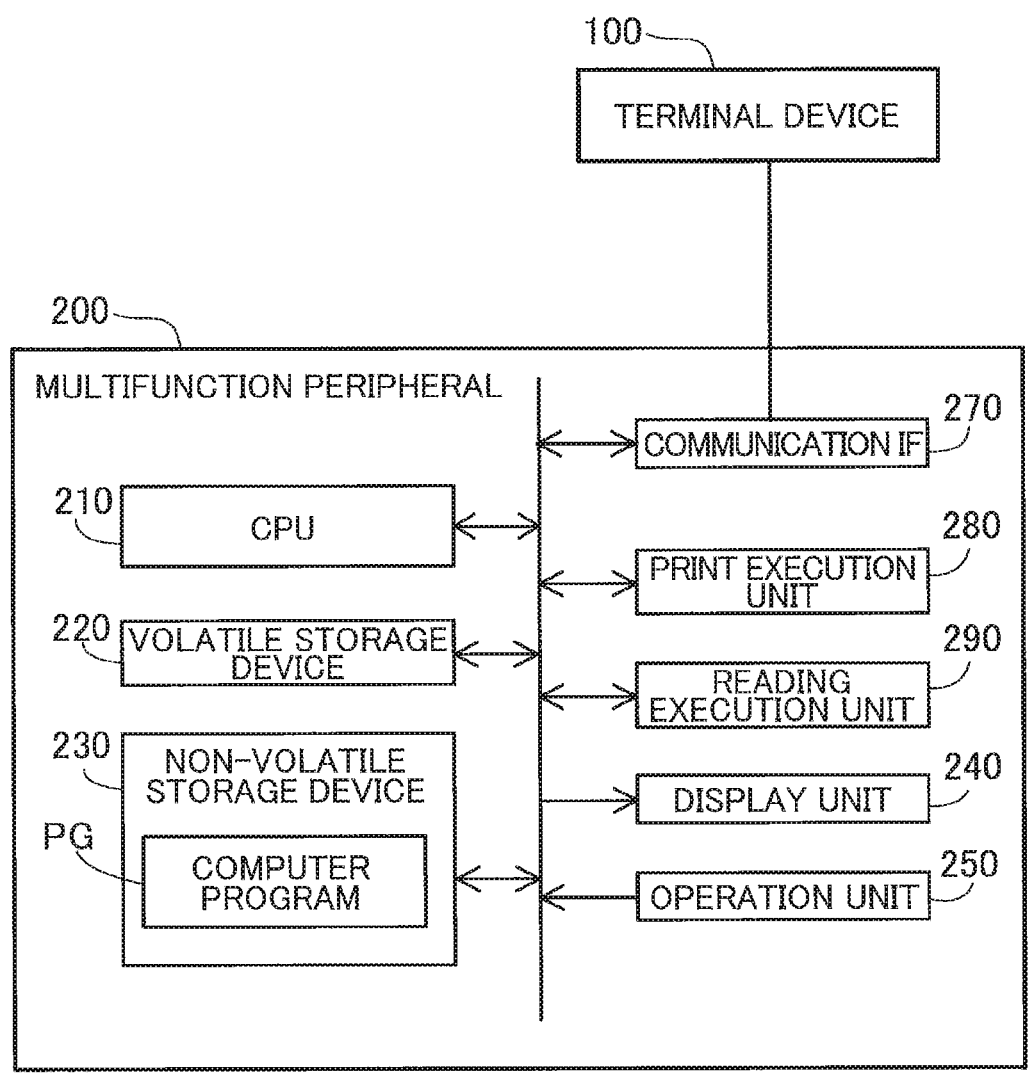
FIG. 1 is a block diagram illustrating a configuration of a multifunction peripheral according to an embodiment of the present disclosure.

An image processing apparatus according to an embodiment will be described while referring to the accompanying drawings wherein like parts and components are designated by the same reference numerals to avoid duplicating description. FIG. 1 is a block diagram illustrating the configuration of a multifunction peripheral 200 as an example of the image processing apparatus. The multifunction peripheral 200 includes a central processing unit (CPU) 210 which is a processor for controlling the multifunction peripheral 200, a volatile storage device 220 such as a dynamic random access memory (DRAM), a non-volatile storage device 230 such as a flash memory, a hard disk drive, or the like, a display unit 240 including a liquid crystal display and the like, an operating unit 250 including a touch panel and buttons superimposed on the liquid crystal display, an interface (communication IF) 270 for communicating with an external device such as a user terminal device 100, a print execution unit 280, and a reading execution unit 290.

The reading execution unit 290 optically reads an original using an image sensor according to control of the CPU 210 to generate scan data. The print execution unit 280 prints an image onto a print medium such as a paper sheet with a laser according to control of the CPU 210 by using a plurality of types of toner, specifically toner in the colors cyan (C), magenta (M), yellow (Y), and black (K), as coloring materials. More specifically, the print execution unit 280 exposes a photosensitive drum to form an electrostatic latent image and makes the toner adhere to the electrostatic latent image to thereby form a toner image. The print execution unit 280 transfers the toner image formed on the photosensitive drum onto the paper sheet.

The volatile storage device 220 provides a buffer area for temporarily storing various intermediate data generated when the CPU 210 performs processing. The non-volatile storage device 230 stores a computer program PG therein. The computer program PG is a control program allowing the CPU 210 to perform control of the multifunction peripheral 200. In the present embodiment, the computer program PG is previously stored in the non-volatile storage device 230 at the time of manufacturing the multifunction peripheral 200. Alternatively, the computer program PG may be provided by being downloaded from a server or by being stored in a DVD-ROM and the like. The CPU 210 executes the computer program PG to thereby execute image processing to be described later.

A-2: Image Processing

Figure 2:
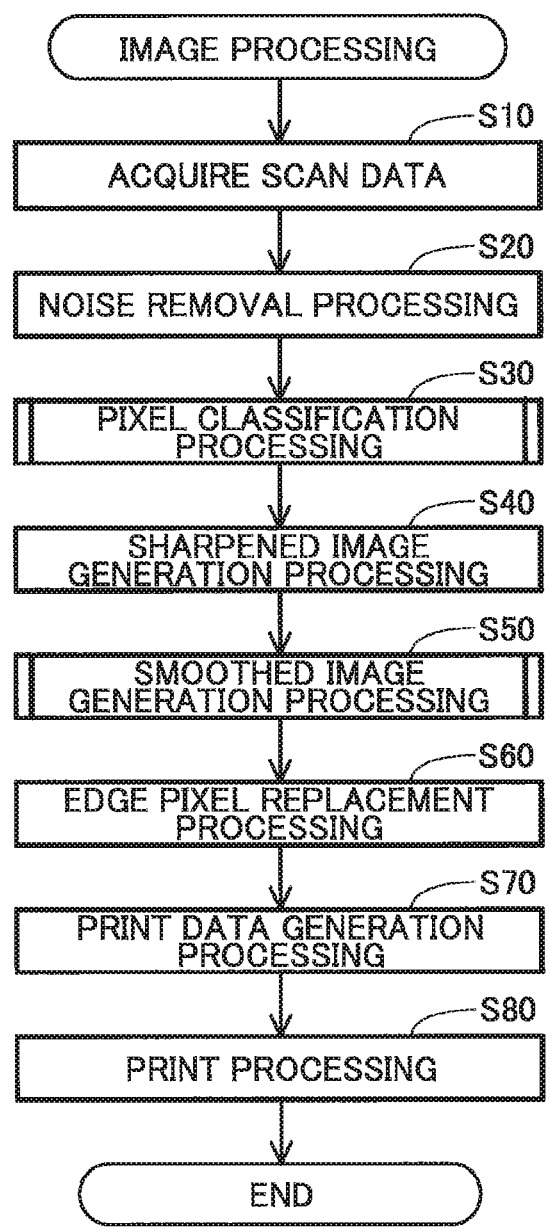
FIG. 2 is a flowchart illustrating steps in image processing executed by the multifunction peripheral of the embodiment.

FIG. 2 is a flowchart illustrating steps in image processing. The image processing is executed when, for example, a user places an original on a platen of the reading execution unit 290 and the operation is made on the operation unit 250 to input a copy execution instruction. The image processing is processing that acquires scan data generated by the reading execution unit 290 reading the original and, from the scan data, generates print image data representing the original to thereby copy the original.

In S10, the CPU 210 reads the original placed on the platen by the user using the reading execution unit 290 to generate scan data as target image data. The original is a printed matter on which an image is printed by, for example, the multifunction peripheral 200 or an unillustrated printer. The generated scan data is stored in the buffer area of the volatile storage device 220 (FIG. 1). Thus, the CPU 210 acquires the scan data of the original as the target image data. The scan data is RGB image data in which the color of each pixel is represented by an RGB value. The RGB value of one pixel includes three component values of, for example, red (R), green (G), and blue (B) (hereinafter, referred to also as "R value", "G value", and "B value"). In the present embodiment, the number of gradations of each component value is 256.

Figure 3A:
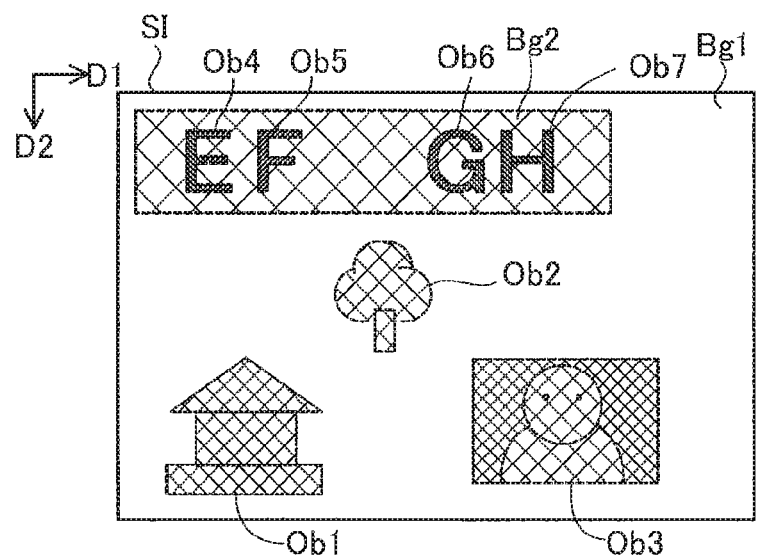

FIGS. 3A and 3B and FIGS. 4A to 4C are views each illustrating an example of an image used in the image processing. FIG. 3A illustrates an example of a scan image SI represented by the scan data. The scan image SI is made up of a plurality of pixels arranged in a matrix form in which the pixels are arranged in rows (first direction D1) and columns (second direction D2). The second direction D2 is orthogonal to the first direction D1.

The scan image SI illustrated in FIG. 3A includes a white background Bg1 representing the base color of the paper sheet of the original, three non-character objects Ob1 to Ob3, four character objects Ob4 to Ob7, and a background Bg2 of the four character objects Ob4 to Ob7. Each of the non-character objects is, for example, a photograph object or a drawing object. The background Bg2 is a uniform image having a color different from white.

Figure 5:
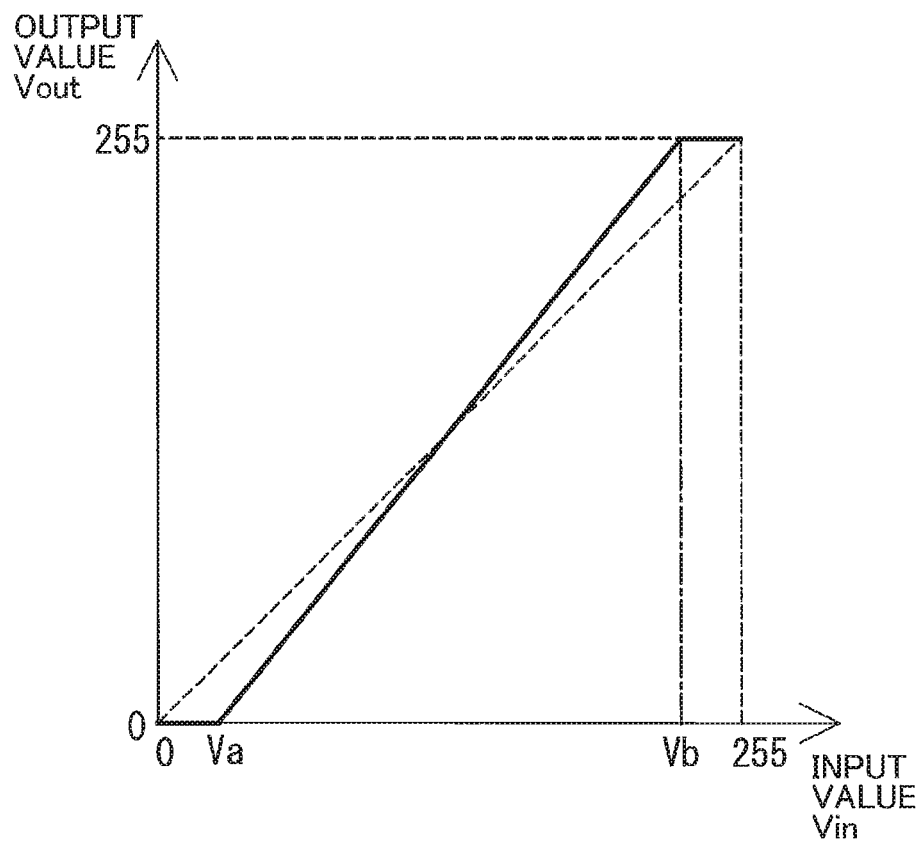
FIG. 5 is a view illustrating an example of a tone curve for use in noise removal processing.

In S20, the CPU 210 applies noise removal processing to the scan data. FIG. 5 is a view illustrating an example of a tone curve for use in the noise removal processing. Specifically, the CPU 210 applies the tone curve illustrated in FIG. 5 to the R value, G value, and B value of each of the plurality of pixels included in the scan data. More specifically, each of the R value, G value, and B value is taken as an input value Vin, and an output value Vout corresponding to the input value Vin on the tone curve is taken as a converted value. As a result, R, G, and B values equal to or greater than a threshold Vb (for example, 245) are all converted into the maximum value (255), and R, G, and B values equal to or smaller than a threshold Va (for example, 10) are all converted into the minimum value (0). Thus, noise in a white area (for example, background Bg1) and a black area of the scan image SI is removed. Hereinafter, the scan data that has been subjected to the noise removal processing is referred to also merely as scan data, and the scan image SI represented by the noise-removed scan data is referred to also merely as scan image SI.

In S30, the CPU 210 applies pixel classification processing to the scan data. The pixel classification processing is processing that classifies the plurality of pixels constituting the scan image SI into a plurality of edge pixels constituting edges and a plurality of non-edge pixels not constituting the edges.

Figure 3B:
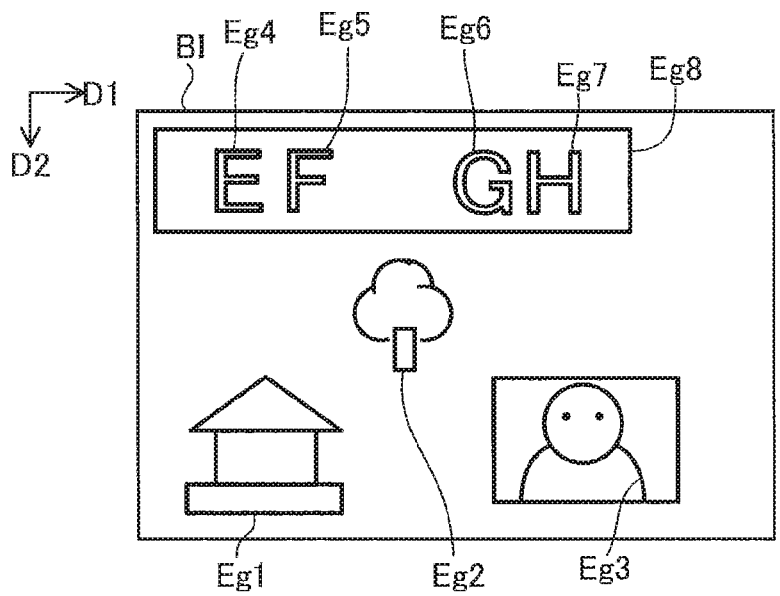

As a result of the pixel classification processing, binary image data in which the values of the edge pixel and non-edge pixel are, for example, "1" and "0", respectively, is generated. FIG. 3B illustrates an example of a binary image BI represented by the binary image data. In the binary image BI, a plurality of edge pixels constituting edges Eg1 to Eg7 of the respective objects Ob1 to Ob7 in the scan image SI and a plurality of edge pixels constituting an edge Eg8 as the boundary between the backgrounds Bg1 and Bg2 in the scan image SI are specified. The binary image data is data representing a result of the pixel classification processing and is thus referred to also as "classification data". Details of the pixel classification processing will be described later.

In S40, the CPU 210 executes sharpened image generation processing. Specifically, the CPU 210 applies sharpening processing to the noise-removed scan data generated in S20 to generate sharpened image data. As the sharpening processing, known processing such as unsharp mask processing or sharpening filter application processing is used. In the present embodiment, values to be used in finally-generated processed image data (to be described later) are only those of the edge pixels in the sharpened image data; however, in this step, the sharpening processing is applied to the entire scan data including the values of the edge pixels and non-edge pixels. This allows the sharpening processing to be easily executed by using, for example, existing sharpening processing function (an existing program or a dedicated circuit such as an ASIC).

Figure 4A:
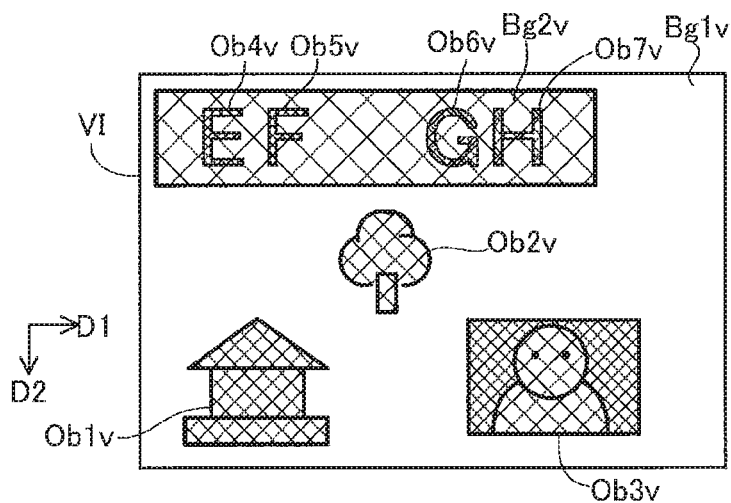

FIG. 4A illustrates a sharpened image VI represented by the sharpened image data. The sharpened image VI includes a white background Bg1v, and objects Ob1v to Ob7v and a background Bg2v obtained by sharpening the objects Ob1 to Ob7 and background Bg2 in the scan image SI, respectively. The edges of the objects Ob1v to Ob7v and background Bg2v are sharper than those of the objects Ob1 to Ob7 and background Bg2 in the scan image SI illustrated in FIG. 3A.

In S50, the CPU 210 executes smoothed image generation processing. Specifically, the CPU 210 applies smoothing processing to the noise-removed scan data generated in S20 to generate smoothed image data. Although details will be described later, the smoothed image generation processing is contrived such that when the smoothing processing is applied to the values of the non-edge pixels, it is suppressed from being affected by the values of the edge pixels.

Figure 4B:
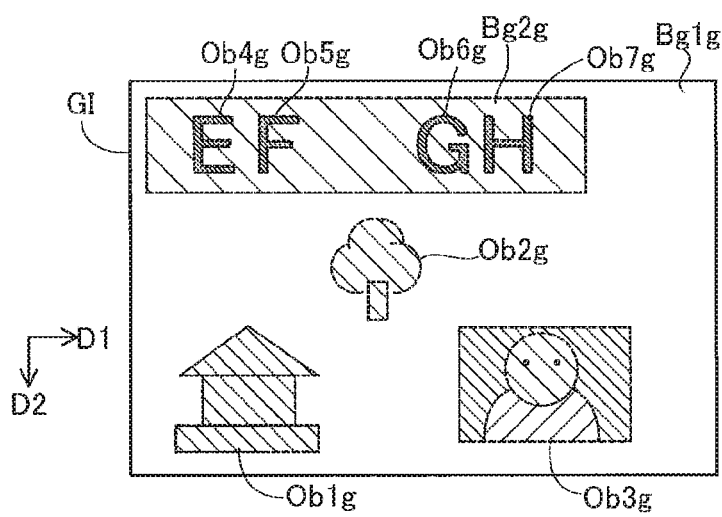

FIG. 4B illustrates a smoothed image GI represented by the smoothed image data. The smoothed image GI includes a white background Bg1g, and objects Ob1g to Ob7g and a background Bg2g obtained by smoothing the objects Ob1 to Ob7 and background Bg2 in the scan image SI, respectively. Portions (non-edge portions) of the objects Ob1g to Ob7g and background Bg2g other than the edges thereof are smoother than those of the objects Ob1 to Ob7 and background Bg2 in the scan image SI illustrated in FIG. 3A.

In S60, the CPU 210 uses the smoothed image data and sharpened image data to execute edge pixel replacement processing. Specifically, the CPU 210 replaces the values of the edge pixels in the smoothed image data with the values of the edge pixels in the sharpened imaged data. The values of the pixels to be replaced are specified by referring to the binary image data. For example, pixels in the smoothed image GI corresponding to the edge pixels constituting the edges Eg1 to Eg8 specified in the binary image BI illustrated in FIG. 3B are pixels to be replaced. Image data generated by the edge pixel replacement processing is referred to also as "processed image data".

Figure 4C:
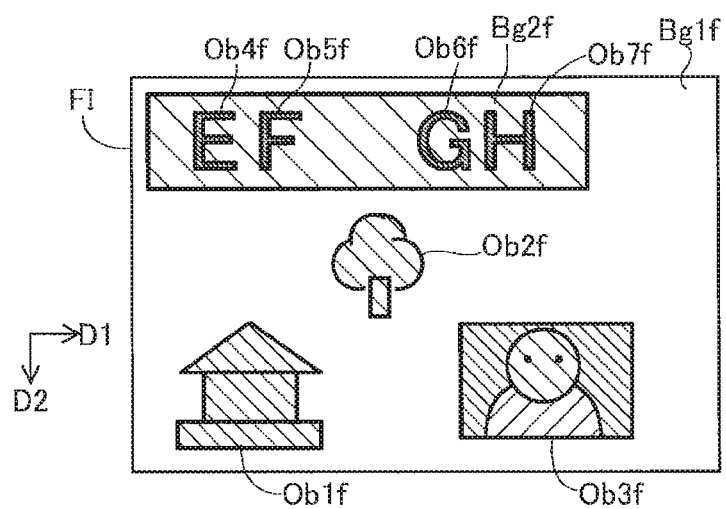

FIG. 4C illustrates a processed image FI represented by the processed image data. The processed image FI includes a white background Bg1f, and objects Ob1f to Ob7f and a background Bg2f corresponding to the objects Ob1 to Ob7 and background Bg2 in the scan image SI, respectively. The objects Ob1f to Ob7f and background Bg2f in the processed image FI illustrated in FIG. 4C include the sharpened edges of the corresponding objects Ob1v to Ob7v and background Bg2v in the sharpened image VI illustrated in FIG. 4A. The objects Ob1f to Ob7f and background Bg2f in the processed image FI illustrated in FIG. 4C include the smoothed non-edges of the corresponding objects Ob1g to Ob7g and background Bg2g in the smoothed image GI illustrated in FIG. 4B. As described above, the processed image data is image data composed of the values of the non-edge pixels in the smoothed image data and the values of the edge pixels in the sharpened image data.

In S70, the CPU 210 executes print data generation processing to generate print data using the processed image data. Specifically, the CPU 210 applies color conversion processing to the processed image data which is RGB image data to generate CMYK image data representing the color of each pixel by a CMYK value which is a color value having color components (components of C, M, Y, and K) corresponding to color materials used in printing. The color conversion processing is executed by referring to, for example, a known look-up table. Halftone processing is applied to the CMYK image data to generate dot data representing a dot formation state for each color material to be used in printing and each pixel. The dot formation state can include, for example, two states of "dot" and "no dot" or four states of "large dot", "medium dot", "small dot", and "no dot". The halftone processing is executed according to, for example, a dither method or an error diffusion method. The dot data are rearranged in the order to be used in printing, and a printing command is added to the rearranged dot data to generate print data.

In S80, the CPU 210 executes the print processing and ends the image processing. Specifically, the CPU 210 supplies the print data to the print execution unit 280 to make the print execution unit 280 print the processed image.

According to the image processing described above, the processed image data including the values of edge pixels that have been subjected to the sharpening processing (i.e., values of the edge pixels in the sharpened image data) and the values of the non-edge pixels that have been subjected to the smoothing processing (i.e., values of non-edge pixels in the smoothed image data) is generated (S60). As a result, the processed image data representing the good-looking processed image FI can be generated.

More specifically, in the processed image data, values that have been subjected to the sharpening processing are used for the values of the edge pixels constituting the edges of the objects and the like, as illustrated in the processed image FI of FIG. 4C. As a result, the edges in the processed image FI look sharp, so that the processed image FI to be printed can be improved in appearance, for example.

Further, in the processed image data, values that have been subjected to the smoothing processing are used for the values of the non-edge pixels constituting a uniform portion such as the background Bg2 in the processed image H or a portion different from the edges of the object. As a result, for example, a periodic component that may cause moire can be suppressed from appearing at the portion different from the edges in the processed image FI, which can suppress problems such as moire from occurring in the processed image FI to be printed. Accordingly, the processed image FI to be printed can be improved in appearance.

For example, the original used in generating the scan data is a printed matter on which an image is printed. Thus, at the level of dots constituting an image, halftone dots are formed in a uniform portion, such as the background Bg2, having a color different from white in the original. The halftone dots include a plurality of dots and a portion having no dot (portion representing the base color of the original). Therefore, at the pixel level, the halftone dots are formed in an area representing the background Bg2 in the scan image SI. The dots in the halftone dots are arranged with periodicity due to influence of a dither matrix and the like used for printing the original. Therefore, when printing is performed using the scan data, moire is likely to appear due to interference between the periodic components of the dot pattern in the halftone dots existing in the original image (scan image SI) before the halftone processing and the periodic components of the dot pattern in the halftone dots constituting a print image. In the processed image FI of the present embodiment, the periodic components of the dot pattern constituting a portion other than the edges in the original image (scan image SI) are reduced by the smoothing processing. As a result, when the processed image FI is printed using the processed image data, problems such as moire can be suppressed from occurring in the processed image FI to be printed.

Further, in the image processing described above, the sharpening processing is applied to the scan data before being subjected to the smoothing processing to generate the sharpened image data (S40). In addition, the smoothing processing is applied to the scan data before being subjected to the sharpening processing to generate the smoothed image data (S50). With this configuration, adequate sharpened image data and smoothed image data can be generated. For example, assume that the smoothing processing is applied to the scan data that has been subjected to the sharpening processing. In this case, a density difference among the non-edge pixels may be increased in the sharpened image data, so that the smoothing may not be achieved sufficiently.

Further, as described above, in the image processing described above, the processed image data is generated by replacing the values of the edge pixels in the smoothed image data with the values of the corresponding edge pixels in the sharpened image data (S60). As a result, a memory amount required for generating the processed image data can be reduced as compared to, for example, a case where processed image data including the values of the pixels in the smoothed image data and the values of the pixels in the sharpened image data is generated independently of the smoothed image data and sharpened image data. Further, the number of the edge pixels is generally smaller than the number of the non-edge pixels, so that a processing time required for generating the processed image data can be reduced as compared to a case where the processed image data is generated by replacing the values of the non-edge pixels in the sharpened image data with the values of the corresponding non-edge pixels in the smoothed image data.

A-3: Pixel Classification Processing

Figure 6:
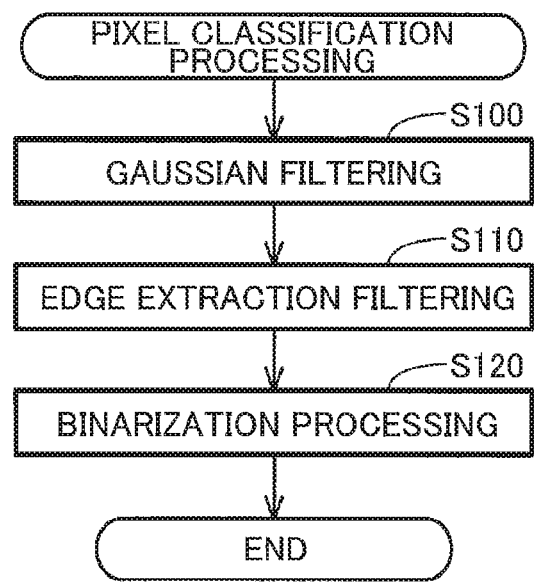
FIG. 6 is a flowchart illustrating steps in pixel classification processing.

The pixel classification processing performed in S30 of FIG. 2 will be described. FIG. 6 is a flowchart illustrating steps in the pixel classification processing. In S100, the CPU 210 executes Gaussian filtering to apply a Gaussian filter to the scan data to generate image data for classification representing an image for classification (not illustrated). The Gaussian filter is a type of a smoothing filter used for smoothing an image. Since details of the Gaussian filter will be described later in the description of the smoothed image generation processing, description thereof will be omitted here.

In S110, the CPU 210 executes edge extraction filtering to apply an edge extraction filter such as a Sobel filter or a Prewitt filter to the image data for classification to thereby generate edge image data. The value of each pixel constituting the edge image data takes 256 gradation values from 0 to 255 to represent edge intensity of each pixel.

In S120, the CPU 210 executes binarization processing to the edge image data to generate binary image data (classification data). For example, the CPU 210 classifies pixels having a value (i.e., edge intensity) equal to or greater than a threshold (for example, 128) into the edge pixels and classifies pixels having a value smaller than the threshold into the non-edge pixels. As described above, in the binary image data, the values of the edge pixel and non-edge pixel are "1" and "0", respectively.

In the pixel classification processing, the edge extraction processing of S110 is applied to the image data for classification obtained as a result of the Gaussian filtering of S100, so that pixels in an area not including the edge pixels can be prevented from being erroneously classified into the edge pixel. For example, as described above, the original used in generating the scan data is a printed matter on which an image is printed. Thus, at the pixel level, halftone dots are formed in the area corresponding to the background Bg2 in the scan image SI. Accordingly, if the edge extraction filtering is applied to the scan data that has not been subjected to the Gaussian filtering, a pixel representing each dot in the halftone dots can be erroneously specified as the edge pixel.

A-4: Smoothed Image Generation Processing

Figure 7:
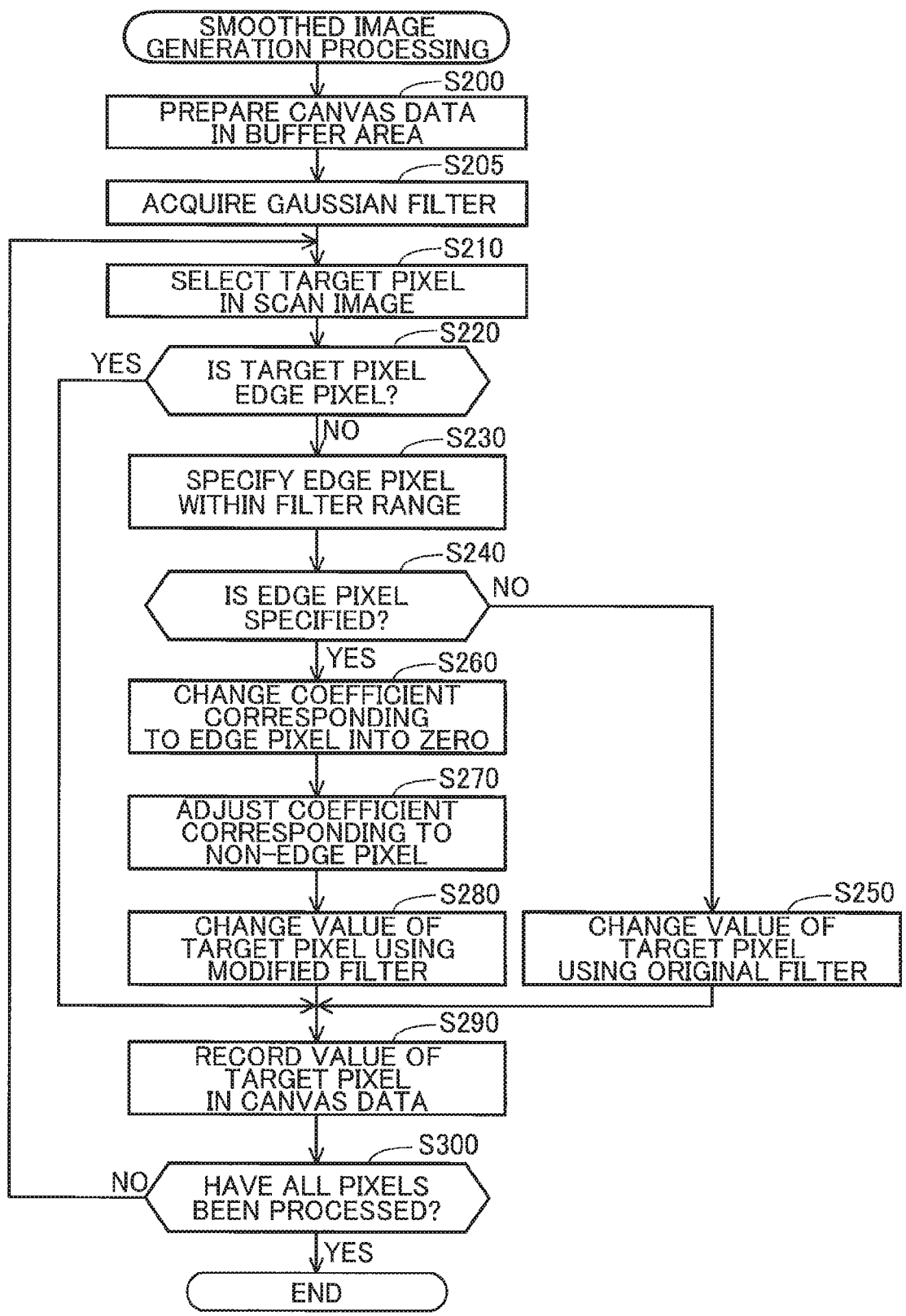
FIG. 7 is a flowchart illustrating steps in smoothed image generation processing.

The smoothed image generation processing performed in S50 of FIG. 2 will be described. FIG. 7 is a flowchart illustrating steps in the smoothed image generation processing. FIGS. 8A to 8D are explanatory views for explaining the smoothed image generation processing. In S200, the CPU 210 prepares canvas data for generating the smoothed image GI in the buffer area of the volatile storage device 220. A canvas (initial image) represented by the canvas data is an RGB image having the same size as the scan image SI, in which the RGB value of each pixel is set to an initial value (for example, a value representing white).

In S205, the CPU 210 acquires a previously prepared original filter, specifically, a Gaussian filter GF recorded in the computer program PG, and records the Gaussian filter GF in the buffer area of the volatile storage device 220. The Gaussian filter GF illustrated in FIG. 8B specifies coefficients within a predetermined filter range, specifically, coefficients corresponding to respective ones of nine pixels of three-by-three pixels arranged in a matrix form in which the pixels are arranged in rows (first direction D1) and columns (second direction D2). Hereinafter, for the purpose of illustration, the upstream and downstream sides in the first direction D1 will be described as the left and right, respectively, and the upstream and downstream sides in the second direction D2 will be described as the top and bottom, respectively. In other words, the Gaussian filter specifies one coefficient corresponding to a target pixel and coefficients corresponding to eight peripheral pixels including four pixels adjacent to the left, right, top, and bottom of the target pixel. The coefficient corresponding to the target pixel is (4/16). The coefficients corresponding to the four pixels adjacent to the left, right, top, and bottom of the target pixel are (2/16), and coefficients corresponding to the four pixels positioned at the lower right, lower left, upper right, and upper left of the target pixel are (1/16).

In S210, the CPU 210 sequentially selects a target pixel one by one from a plurality of pixels in the scan image SI represented by the noise-removed scan data generated in S20 of FIG. 2.

In S220, the CPU 210 determines whether or not the target pixel is the edge pixel. This determination is made by referring to the binary image data (classification data) generated by the pixel classification processing performed in S30 of FIG. 2. When the target pixel is not the edge pixel, that is, when the target pixel is the non-edge pixel (S220: NO), the target pixel should be subjected to the smoothing processing. Accordingly, in this case, the CPU 210 executes the smoothing processing of S230 to S280. When the target pixel is the edge pixel (S220: YES), the target pixel should not be subjected to the smoothing processing. Accordingly, in this case, the CPU 210 skips the smoothing processing of S230 to S280 and proceeds to S290. Thus, when the target pixel is the edge pixel, the value (RGB value) of the target pixel is not changed in the smoothed image data, but remains the same as the value in the scan data.

In S230, the CPU 210 specifies the edge pixel existing within the above-mentioned filter range having the target pixel at the center thereof. In the smoothing processing of the present embodiment, the Gaussian filter GF (FIG. 8B) corresponding to nine pixels of three-by-three pixels arranged in a matrix form is used. Accordingly, the filter range covers three-by-three pixels with the target pixel as the center.

FIG. 8A is a view conceptually illustrating a part of the scan image SI. In FIG. 8A, an area EP constituted of the edge pixels is hatched, while areas SP constituted of the non-edge pixels are not hatched. In the scan data, the values of a plurality of pixels in the scan image SI of FIG. 8A take various RGB values. The edge pixels and non-edge pixels can be specified by referring to the binary image data (classification data) representing a result of the pixel classification processing performed in S30 of FIG. 2.

In FIG. 8A, a filter range FL1 of a first target pixel CC1, a filter range FL2 of a second target pixel CC2, and a filter range FL3 of a third target pixel CC3 are illustrated. When the target pixel is the first target pixel CC1, three pixels positioned above, at the upper left, and at the left of the first target pixel CC1 out of the eight peripheral pixels are specified as the edge pixels in the filter range FL1. When the target pixel is the second target pixel CC2, two pixels positioned below and at the lower right of the second target pixel CC2 are specified as the edge pixels in the filter range FL2. When the target pixel is the third target pixel CC3, all the eight peripheral pixels are non-edge pixels, so that no edge pixel is specified in the filter range FL3.

In S240, the CPU 210 determines whether or not any edge pixel is specified in the filter range of the target pixel. When no edge pixel is specified in the filter range of the target pixel (S240: NO), the CPU 210 proceeds to S250 and uses the original filter (Gaussian filter GF) to determine the value (RGB value) of the target pixel after the smoothing processing. Specifically, the CPU 210 multiplies the R values of the respective nine pixels in the filter range including the target pixel and its peripheral pixels by their corresponding coefficients specified in the Gaussian filter GF to calculate nine modified R values. Then, the CPU 210 calculates the sum of the nine modified R values as the changed R value of the target pixel. The CPU 210 then calculates the changed G and B values of the target pixel in the same way. When the changed value of the target pixel, i.e., the value of the target pixel after the smoothing processing is calculated, then the CPU 210 proceeds to S290.

When any edge pixel is specified in the filter range (S240: YES), the CPU 210 proceeds to S260 and changes, out of nine coefficients of the Gaussian filter GF (original filter) of FIG. 8B, one or more coefficients corresponding to one or more edge pixels specified in S230 into "0".

FIG. 8C illustrates a modified filter AF1 for the first target pixel CC1, and FIG. 8D illustrates a modified filter AF2 for the second target pixel CC2. When the target pixel is the first target pixel CC1, coefficients corresponding to three peripheral pixels positioned above, at the upper left, and at the left of the target pixel are changed into "0", as shown in the modified filter AF1. When the target pixel is the second target pixel CC2, coefficients corresponding to two peripheral pixels positioned below and at the lower right of the target pixel are changed into "0", as shown in the modified filter AF2.

In S270, the CPU 210 adjusts the remaining coefficients, i.e., one or more coefficients corresponding to the target pixel and non-edge pixel in accordance with the change of the coefficient of the edge pixel in S260. Specifically, the CPU 210 adjusts the denominators of the coefficients such that the sum of one or more coefficients corresponding to the target pixel and non-edge pixel becomes "1". For example, in the original filter (Gaussian filter GF), the denominator of each coefficient is "16". On the other hand, the denominator of the modified filter AF1 (FIG. 8C) for the first target pixel CC1 is set to "11" which is the sum of the numerators of six coefficients corresponding to the target pixel and five non-edge pixels, and the denominator of the modified filter AF2 (FIG. 8D) for the second target pixel CC2 is set to "13" which is the sum of the numerators of seven coefficients corresponding to the target pixel and six non-edge pixels.

In S280, the CPU 210 uses the modified filter to determine the value (RGB value) of the target pixel after the smoothing processing. That is, in place of the above-described Gaussian filter GF, the modified filter is used to calculate the R value, G value, and B value of the target pixel after the smoothing processing. For example, when the target pixel is the first target pixel CC1, the CPU 210 multiplies the R values of the nine pixels in the filter range including the target pixel and its peripheral pixels by their corresponding coefficients specified in the modified filter AF1 to calculate nine modified R values. Then, the sum of the nine modified R values is calculated as the changed R value of the target pixel, i.e., the R value of the target pixel after the smoothing processing. The CPU 210 also uses the modified filter AF1 to calculate the changed G and B values of the target pixel, i.e., the G and B values of the target pixel after the smoothing processing in the same way. As described above, in the modified filter AF1, the coefficients corresponding to three edge pixels positioned above, at the upper left, and at the left of the target pixel is "0". Thus, the value of the first target pixel CC1 after the smoothing processing is calculated without using the values of the three edge pixels positioned above, at the upper left, and at the left of the target pixel but by using the values of remaining five non-edge pixels out of eight peripheral pixels. Further, in the modified filter AF2, the coefficients corresponding to two edge pixels positioned below and at the lower right of the target pixel is "0". Thus, the value of the second target pixel CC2 after the smoothing processing is calculated without using the values of the two edge pixels positioned below and at the lower right of the target pixel but by using the values of the remaining six non-edge pixels out of eight peripheral pixels.

In S290, the CPU 210 records the determined value of the target pixel in the canvas data prepared in S200. When the target pixel is the edge pixel (S220: YES), the value of the target pixel in the scan data is recorded as it is in the canvas data. When the target pixel is the non-edge pixel (S220: NO), the value of the target pixel calculated in S250 or S280 is recorded in the canvas data.

In S300, the CPU 210 determines whether or not all the pixels in the scan image SI have been processed as the target pixel. When there is any unprocessed pixel (S300: NO), the CPU 210 returns to S210. When determining that all the pixels have been processed (S300: YES), the CPU 210 ends the smoothed image generation processing.

According to the embodiment described above, the smoothing processing is applied to the values (RGB values) of the plurality of respective non-edge pixels in the scan image SI (S50 in FIG. 2, FIG. 7). The smoothing processing for one non-edge pixel is performed using the values of the pixels in the filter range (S250 and S280 in FIG. 7). That is, the smoothing processing includes processing of changing the value of the target pixel using the value of the target pixel which is the non-edge pixel and the value of at least one pixel (for example, non-edge pixel) out of eight peripheral pixels including pixels adjacent to the target pixel (S280 in FIG. 7).

In the smoothing processing, contribution, to the target pixel, of the value of each of specific peripheral pixels positioned at specific positions with respect to the target pixel, that is, in the example of FIGS. 8A to 8D, contribution of the value of each of three peripheral pixels positioned above, at the upper left, and at the left of the target pixel, is a first contribution ("0" in the example of FIG. 8C) when the target pixel is the first target pixel CC1 having the edge pixels as the specific peripheral pixels. On the other hand, when the target pixel is the second target pixel CC2 having the non-edge pixels as the specific peripheral pixels (three peripheral pixels positioned above, at the upper left, and at the left of the target pixel in the example of FIG. 8A), the contribution is a second contribution (($\frac{1}{13}$) or ($\frac{2}{13}$) in the example of FIG. 8D) which is greater than the first contribution.

As a result, in the smoothing processing, it can be suppressed that the value of the non-edge pixel to be changed is affected by the value of the edge pixel. Thus, the smoothed image GI can be prevented from being degraded in image quality. For example, in the scan image SI, the density of the non-edge pixel and that of the edge pixel may often differ significantly from each other like a combination of the non-edge pixel constituting the background and the edge pixel constituting the character. In such a case, if the value of the non-edge pixel to be changed is affected by the value of the edge pixel in the smoothing processing, the density of the non-edge pixel after the change may excessively be increased. This may cause a problem in that a portion in the vicinity of the edge pixel looks blurred or assumes an inadequate color, which can degrade image quality of the smoothed image. According to the present embodiment, occurrence of such a problem can be suppressed.

Further, in the present embodiment, the CPU 210 determines weights (in the present embodiment, coefficients specified in the modified filters AF1 and AF2) corresponding to respective ones of the plurality of peripheral pixels around the target pixel and determines the value of the target pixel using the values of the peripheral pixels and their corresponding weights (S280 in FIG. 7). At this time, each of the weights corresponding to the specific peripheral pixels around the first target pixel CC1 (in the example of FIGS. 8A to 8D, three peripheral pixels positioned above, at the upper left, and at the left of the target pixel CC1) is a first weight (in the example of FIG. 8C, "0"). Each of the weights corresponding to the specific peripheral pixels around the second target pixel CC2 (in the example of FIGS. 8A to 8D, three peripheral pixels positioned above, at the upper left, and at the left of the target pixel CC2) is a second weight (in the example of FIG. 8D, ($\frac{1}{13}$) or ($\frac{2}{13}$)) which is greater than the first weight. As a result, in the smoothing processing, by using the weights determined for respective ones of the peripheral pixels, the value of the non-edge pixel can be properly suppressed from being affected by the value of the edge pixel.

More specifically, the CPU 210 changes, out of the coefficients specified in the Gaussian filter GF, the coefficient corresponding to the peripheral pixel classified into the edge pixel for each target pixel on the basis of the result of the pixel classification processing to thereby generate the modified filters AF1 and AF2 (S260 and S270 in FIG. 7). Then, the CPU 210 changes the value of the target pixel using the coefficients specified in the modified filter AF1 or AF2 as the weights corresponding to the respective ones of the peripheral pixels (S280). As a result, the weights corresponding to the respective ones of the peripheral pixels can be easily set to adequate values, so that the smoothing processing for the value of the non-edge pixel can be executed easily and adequately.

Further, in the embodiment described above, as can be seen from a fact that the coefficient corresponding to the edge pixel is set to "0" in the modified filters AF1 and AF2, the value of the target pixel is determined without using the value of the edge pixel, but by using the value of the non-edge pixel out of the peripheral pixels (FIGS. 8C and 8D). As a result, in the smoothing processing, the value of the non-edge pixel can be suppressed more effectively from being affected by the value of the edge pixel.

B. Modifications:

(1) In the pixel classification processing of the embodiment described above, the pixels constituting the scan image SI are classified into the edge pixels and the non-edge pixels. Alternatively, in the pixel classification processing, the pixels constituting the scan image SI may be classified into a plurality of object pixels which constitute an object (for example, character) and include edge pixels, and a plurality of background pixels which constitute the background. In this case, in the smoothed image generation processing, the smoothing processing (S230 to S280) of FIG. 7 may be applied only to the background pixels and may not be applied to the object pixels.

(2) In the pixel classification processing of the embodiment described above, the Gaussian filter is used as the original filter for the smoothing processing. Alternatively, a mean value filter that sets the mean value of the pixels in the filter range as the value of the target pixel may be used.

(3) In the embodiment described above, the CPU 210 changes the coefficient corresponding to the edge pixel into "0" when generating the modified filters AF1 and AF2. Alternatively, the CPU 210 may change the coefficient corresponding to the edge pixel into a value which is different from "0" and is smaller than the coefficient before the change when generating the modified filters AF1 and AF2. For example, the coefficient corresponding to the edge pixel may be changed into a value obtained by multiplying the coefficient before the change by a value smaller than 1 such as "⅓" or "¼". In general, the coefficient is preferably set to a value smaller than the coefficient before the change (including "0") such that the contribution of the specific peripheral pixels around the first target pixel CC1 (for example, three peripheral pixels positioned above, at the upper left, and at the left of the target pixel of FIG. 8C) is smaller than the contribution of the specific peripheral pixels around the second target pixel CC2.

(4) In the embodiment described above, the smoothing processing for the value of the target pixel (S230 to S280 in FIG. 7) is executed using the filter; however, the filter may not be used. For example, the CPU 210 specifies N number of non-edge pixels (N is an integer equal to or greater than zero and equal to or smaller than eight) obtained by excluding M number of edge pixels (M is an integer equal to or greater than zero and equal to or smaller than eight, and satisfies the relation M+N=8) from the eight peripheral pixels around the target pixel. The CPU 210 may calculate the mean value of the values of (N+1) number of pixels including the N number of non-edge pixels and one target pixel as the value of the target pixel after the smoothing processing.

(5) In the smoothing processing of the embodiment described above, the Gaussian filter GF having a filter range of three-by-three pixels arranged in a matrix form is used as the original filter. Alternatively, a Gaussian filter GF or a mean value filter having a filter range of five-by-five pixels arranged in a matrix form or seven-by-seven pixels arranged in a matrix form may be used as the original filter. Thus, the number of peripheral pixels used in the smoothing processing can be appropriately altered depending on reading characteristics such as the resolution or blurring degree of the scan data.

(6) In the smoothing processing of the embodiment described above, the smoothing processing is applied only to the non-edge pixels as the target pixel and may not be applied to the non-edge pixels as the target pixel. Alternatively, the smoothing processing may be applied to the entire scan data. In this case, the edge pixel replacement processing in S60 of FIG. 2 replaces the values of the edge pixels included in the smoothed image data generated in S50 with the values of the edge pixels included in the sharpened image data generated in the sharpened image generation processing of S40.

(7) In the embodiment described above, the scan data is used as the target image data. Alternatively, photographed image data generated by photographing an original using a digital camera may be used as the target image data. Further, image data generated by using an application program for creating a document or an illustration may be used as the target image data.

(8) The sharpened image generation processing of S40 in FIG. 2 and the edge pixel replacement processing of S60 in FIG. 2 in the embodiment described above may be omitted. In this case, print data is generated using the smoothed image data in S70.

(9) In the sharpened image generation processing of S40 in the embodiment described above, the sharpening processing is applied to the entire scan data. Alternatively, the sharpening processing may be applied only to the edge pixels and may not be applied to the non-edge pixels. Further, in place of the sharpened image generation processing of S40, the sharpening processing may be applied to the entire smoothed image data generated in S50 or to the values of the edge pixels included in the smoothed image data.

(10) In the embodiment described above, the processed image data is generated by replacing the values of the edge pixels in the smoothed image data with the values of the corresponding edge pixels in the sharpened image data (S60). Alternatively, for example, processed image data including the values of the pixels in the smoothed image data and the values of the pixels in the sharpened image data may be generated separately from the smoothed image data and sharpened image data.

(11) In the embodiment described above, image processing including the smoothed image generation processing is performed for so-called "copying" in which the scan data is used to generate print data. Alternatively, image data for storage (for example, a PDF file) may be generated using the scan data. In this case, the scan data is used to perform image processing including the smoothed image generation processing to generate the processed image data, and the generated processed image data is used to generate the image data for storage.

(12) In the pixel classification processing of S30 in FIG. 2, a plurality of pixels in the scan image SI are classified into the two types of the edge pixels and non-edge pixels. Alternatively, the pixels in the scan image SI may be classified into three types of edge pixels for character, edge pixels for objects other than the character, and the non-edge pixels. In this case, for example, the above-described smoothing processing may be applied to the values of the non-edge pixels, sharpening processing suitable for character may be applied to the values of the edge pixels for character, and another sharpening processing suitable for photographs or drawing may be applied to the values of the edge pixels for objects other than the character.

(13) The image processing apparatus realizing the image processing of FIG. 2 is not limited to the multifunction peripheral 200, but may be various devices. For example, a scanner or a digital camera may execute the image processing of FIG. 2 by using target image data generated by itself so as to generate print data to be supplied to a printer. Further, for example, a terminal device (for example, the terminal device 100) or a server (not illustrated) that can communicate with a scanner and a printer may execute the image processing of FIG. 2 using target image data acquired from a scanner to generate print data to be supplied to a printer. Further, a plurality of computers (for example, cloud servers) communicable with one another through a network may execute the image processing as a whole while sharing the function required for the image processing among them. In this case, the plurality of computers is an example of the image processing apparatus.

(14) In the embodiment described above, some of the configurations implemented through hardware may be replaced by software, and conversely some of the configurations implemented through software may be replaced by hardware. For example, the sharpened image generation processing of S40 in FIG. 2 may be executed by dedicated hardware such as an ASIC.

While the description has been made in detail with reference to the specific embodiment, the embodiment described above is an example for making the present disclosure easier to understand and does not limit the present disclosure. It would be apparent to those skilled in the art that various changes and modifications may be made thereto.

What is claimed is:

1. An image processing apparatus comprising: a processor; and
   a memory storing a set of computer-readable instructions therein, the set of computer-readable instructions, when executed by the processor, causing the image processing apparatus to perform:
   acquiring target image data representing a target image, the target image including a plurality of pixels; classifying the plurality of pixels into a plurality of types including a first type and a second type different from the first type, the plurality of pixels including a plurality of first pixels having respective ones of a plurality of first pixel values and a plurality of second pixels having respective ones of a plurality of second pixel values, the plurality of first pixels constituting an edge in the target image and being classified into the first type, the plurality of second pixels being classified into the second type; and smoothing a target pixel having a target pixel value, the smoothing including:
   designating the target pixel from the plurality of second pixels; and
   changing the target pixel value to a smoothed target pixel value using at least one of a plurality of peripheral pixel values, the plurality of pixels including a plurality of peripheral pixels of the target pixel, the plurality of peripheral pixels including an adjacent pixel to the target pixel and respective ones of the plurality of peripheral pixel values,
   wherein in the smoothing, a first contribution of a first specific peripheral pixel to a first smoothed target pixel value of a first target pixel is smaller than a second contribution of a second specific peripheral pixel to a second smoothed target pixel value of a second target pixel, the first specific peripheral pixel being classified into the first type and being positioned at a specific position relative to the first target pixel, the second specific peripheral pixel being classified into the second type and being positioned at the specific position relative to the second target pixel.

2. The image processing apparatus according to claim 1, wherein the changing includes:
   setting a plurality of weights for respective ones of the plurality of peripheral pixels; and
   calculating the smoothed target pixel value using the plurality of weights and the plurality of peripheral pixel values, and
   wherein a first weight for the first specific peripheral pixel is smaller than a second weight for the second specific peripheral pixel.

3. The image processing apparatus according to claim 2, wherein the smoothing further includes:
   acquiring a filter defining a plurality of coefficients for respective ones of the target pixel and the plurality of peripheral pixels; and
   generating a modified filter defining a plurality of modified coefficients for respective ones of the target pixel and the plurality of peripheral pixels in accordance with a result of the classifying for the plurality of peripheral pixels, at least a coefficient corresponding to a peripheral pixel classified into the first type being changed in the modified filter, and
   wherein the setting setts the plurality of modified coefficients defined by the modified filter as the weights for respective ones of the plurality of peripheral pixels.

4. The image processing apparatus according to claim 1, wherein the changing changes the target pixel value to the smoothed target pixel value using the at least one of the plurality of peripheral pixel values corresponding to one of the plurality of second pixels and without using the plurality of peripheral pixel values corresponding to the plurality of first pixels.

5. The image processing apparatus according to claim 1, wherein the set of computer-readable instructions, when executed by the processor, causes the image processing apparatus to further perform:
   sharpening the plurality of first pixels to change the plurality of first pixel values to a plurality of sharpened first pixel values; and
   generating processed image data for the target image data, the processed image data including the plurality of sharpened first pixel values and a plurality of smoothed second pixel values obtained by smoothing the plurality of second pixels.

6. The image processing apparatus according to claim 5, wherein the sharpening sharpens a whole of the target image including the plurality of first pixels and the plurality of second pixels.

7. The image processing apparatus according to claim 5, wherein the smoothing smooths the target image without performing the sharpening to generate smoothed target image data including the plurality of smoothed second pixel values,
   wherein the sharpening sharpens the target image without performing the smoothing to generate sharpened target image data including the plurality of sharpened first pixel values, and
   wherein the generating generates the processed image data including the plurality of smoothed second pixel values and the plurality of sharpened first pixel values.

8. The image processing apparatus according to claim 7, wherein the smoothed target image data further includes the plurality of first pixel values corresponding to respective ones of the plurality of first pixels, and
   wherein the generating generates the processed image data by replacing the plurality of first pixel values in the smoothed target image data with the plurality of sharpened first pixel values in the sharpened target image data.

9. The image processing apparatus according to claim 1, wherein the acquiring acquires the target image data generated by an image sensor, and
   wherein the set of computer-readable instructions, when executed by the processor, causes the image processing apparatus to further perform:
   generating print data using processed image data for the target image data, the processed image data including a plurality of smoothed second pixel values obtained by smoothing the plurality of second pixels.

10. A non-transitory computer readable storage medium storing a set of program instructions for installed on and executed by a computer, the set of program instructions comprising: acquiring target image data representing a target image, the target image including a plurality of pixels;
  classifying the plurality of pixels into a plurality of types including a first type and a second type different from the first type, the plurality of pixels including a plurality of first pixels having respective ones of a plurality of first pixel values and a plurality of second pixels having respective ones of a plurality of second pixel values, the plurality of first pixels constituting an edge in the target image and being classified into the first type, the plurality of second pixels being classified into the second type; and smoothing a target pixel having a target pixel value, the smoothing including:
  designating the target pixel from the plurality of second pixels;
  and changing the target pixel value to a smoothed target pixel value using at least one of a plurality of peripheral pixel values, the plurality of pixels including a plurality of peripheral pixels of the target pixel, the plurality of peripheral pixels including an adjacent pixel to the target pixel and respective ones of the plurality of peripheral pixel values,
  wherein in the smoothing, a first contribution of a first specific peripheral pixel to a first smoothed target pixel value of a first target pixel is smaller than a second contribution of a second specific peripheral pixel to a second smoothed target pixel value of a second target pixel, the first specific peripheral pixel being classified into the first type and being positioned at a specific position relative to the first target pixel, the second specific peripheral pixel being classified into the second type and being positioned at the specific position relative to the second target pixel.

11. The non-transitory computer readable storage medium according to claim 10, wherein the changing includes:
  setting a plurality of weights for respective ones of the plurality of peripheral pixels; and
  calculating the smoothed target pixel value using the plurality of weights and the plurality of peripheral pixel values, and
  wherein a first weight for the first specific peripheral pixel is smaller than a second weight for the second specific peripheral pixel.

12. The non-transitory computer readable storage medium according to claim 11, wherein the smoothing further includes:
  acquiring a filter defining a plurality of coefficients for respective ones of the target pixel and the plurality of peripheral pixels; and
  generating a modified filter defining a plurality of modified coefficients for respective ones of the target pixel and the plurality of peripheral pixels in accordance with a result of the classifying for the plurality of peripheral pixels, at least a coefficient corresponding to a peripheral pixel classified into the first type being changed in the modified filter, and
  wherein the setting setts the plurality of modified coefficients defined by the modified filter as the weights for respective ones of the plurality of peripheral pixels.

13. The non-transitory computer readable storage medium according to claim 10, wherein the changing changes the target pixel value to the smoothed target pixel value using the at least one of the plurality of peripheral pixel values corresponding to one of the plurality of second pixels and without using the plurality of peripheral pixel values corresponding to the plurality of first pixels.

14. The non-transitory computer readable storage medium according to claim 10, wherein the set of program instructions further comprises:
  sharpening the plurality of first pixels to change the plurality of first pixel values to a plurality of sharpened first pixel values; and
  generating processed image data for the target image data, the processed image data including the plurality of sharpened first pixel values and a plurality of smoothed second pixel values obtained by smoothing the plurality of second pixels.

15. The non-transitory computer readable storage medium according to claim 14, wherein the sharpening sharpens a whole of the target image including the plurality of first pixels and the plurality of second pixels.

16. The non-transitory computer readable storage medium according to claim 14, wherein the smoothing smooths the target image without performing the sharpening to generate smoothed target image data including the plurality of smoothed second pixel values,
  wherein the sharpening sharpens the target image without performing the smoothing to generate sharpened target image data including the plurality of sharpened first pixel values, and
  wherein the generating generates the processed image data including the plurality of smoothed second pixel values and the plurality of sharpened first pixel values.

17. The non-transitory computer readable storage medium according to claim 16, wherein the smoothed target image data further includes the plurality of first pixel values corresponding to respective ones of the plurality of first pixels, and
  wherein the generating generates the processed image data by replacing the plurality of first pixel values in the smoothed target image data with the plurality of sharpened first pixel values in the sharpened target image data.

18. The non-transitory computer readable storage medium according to claim 10, wherein the acquiring acquires the target image data generated by an image sensor, and
  wherein the set of program instructions further comprises:
    generating print data using processed image data for the target image data, the processed image data including a plurality of smoothed second pixel values obtained by smoothing the plurality of second pixels.

19. An image processing method comprising:
  acquiring target image data representing a target image, the target image including a plurality of pixels; classifying the plurality of pixels into a plurality of types including a first type and a second type different from the first type, the plurality of pixels including a plurality of first pixels having respective ones of a plurality of first pixel values and a plurality of second pixels having respective ones of a plurality of second pixel values, the plurality of first pixels constituting an edge in the target image and being classified into the first type, the plurality of second pixels being classified into the second type; and
  smoothing a target pixel having a target pixel value, the smoothing including: designating the target pixel from the plurality of second pixels; and changing the target pixel value to a smoothed target pixel value using at least one of a plurality of peripheral pixel values, the plurality of pixels including a plurality of peripheral pixels of the target pixel, the plurality of peripheral pixels including an adjacent pixel to the target pixel and respective ones of the plurality of peripheral pixel values, wherein in the smoothing, a first contribution of a first specific peripheral pixel to a first smoothed target pixel value of a first target pixel is smaller than a second contribution of a second specific peripheral pixel to a second smoothed target pixel value of a second target pixel, the first specific peripheral pixel being classified into the first type and being positioned at a specific position relative to the first target pixel, the second specific peripheral pixel being classified into the second type and being positioned at the specific position relative to the second target pixel.

* * * * *